United States Patent [19]

Matsuzaki et al.

[11] Patent Number: 5,185,327

[45] Date of Patent: * Feb. 9, 1993

[54] GLUCAN DERIVATIVES HAVING TUMORICIDAL ACTIVITY

[75] Inventors: Kei Matsuzaki, Tokyo; Iwao Yamamoto, Ueda; Akira Misaki, Kobe; Yoshiaki Sone, Izumisano, all of Japan

[73] Assignee: Ajinomoto Company, Inc., Tokyo, Japan

[*] Notice: The portion of the term of this patent subsequent to Nov. 27, 2007 has been disclaimed.

[21] Appl. No.: 572,231

[22] Filed: Aug. 24, 1990

Related U.S. Application Data

[63] Continuation of Ser. No. 16,883, Feb. 20, 1987, Pat. No. 4,973,581.

[51] Int. Cl.⁵ .................. A61K 31/715; C07H 1/00; C07H 3/00
[52] U.S. Cl. ........................ 514/54; 514/57; 536/4.1; 536/56; 536/124; 536/123.12
[58] Field of Search ................ 514/54, 57, 59; 536/1.1, 4.1, 56, 112, 124

[56] References Cited

U.S. PATENT DOCUMENTS

| | | | |
|---|---|---|---|
| 3,856,775 | 12/1974 | Fukuoka et al. | 536/1.1 |
| 3,893,996 | 7/1975 | Hamuro et al. | 536/1.1 |
| 3,987,166 | 10/1976 | Komatsu et al. | 514/54 |
| 4,520,017 | 5/1985 | Tunc | 536/1.1 |
| 4,973,581 | 11/1990 | Matsuzaki et al. | 536/54 |

FOREIGN PATENT DOCUMENTS 58-93702 6/1983 Japan.
60-184502 9/1985 Japan.

OTHER PUBLICATIONS

Matsuzaki et al, Makromol. Chem., vol. 187 (1986) pp. 317–324.

Primary Examiner—Johnnie R. Brown
Assistant Examiner—Everett White
Attorney, Agent, or Firm—Oblon, Spivak, McClelland, Maier & Neustadt

[57] ABSTRACT

A new glucan derivative having at least one side chain branch of a compound selected from the group consisting of galactopyranose, L-arabinofuranose and oligomers thereof is disclosed. These glucan derivatives have high tumoricidal activity and are usable as a tumoricide.

6 Claims, No Drawings

GLUCAN DERIVATIVES HAVING TUMORICIDAL ACTIVITY

This is a continuation of application Ser. No. 07/016,883, filed on Feb. 20, 1987, now U.S. Pat. No. 4,973,581.

BACKGROUND OF THE INVENTION

1. Field of the Invention

The present invention relates to new glucan derivatives having tumoricidal activity, and which are usable as medicines as tumoricides.

2. Discussion of the Background

Numerous natural polysaccharides or natural substances mainly comprising polysaccharides are being found to have tumoricidal activity. In particular, branches β-1,3-glucans such as lentinan as well as BCG and constitutional components of tubercle bacillus are known to have strong tumoricidal activity. (See G. Chihara's "Cancers and Immunological Enhancement" by Kodan-sha Scientific, pp. 77–111, 1980.)

BCG comprises detoxicated live bacteria of bovine tubercle bacillus (*Mycobacterium bovis*), which are not absolutely safe. Therefore, extensive studies have been developed on a variety of extracts derived from cell walls of tubercle bacillus bacteria in attempts to obtain a safer product.

The polysaccharide components of the cell walls of tubercle bacillus bacteria are roughly classified into two groups. (See A. Misaki and I. Azuma's "Annual Report of the Sciences of Living, Osaka City University", 22, 33, 1981.) The first group comprises an α-(1→6)-mannan main chain with side chains of D-mannose, D-mannobiose, oligoarabianan (oligo-α-(1→5)-D-arabinofuranan). The second group comprises a β-(1→4)-galactan main chain with a side chain of oligoarabinan. In particular, the latter is known to have higher tumoricidal activity.

But there is still a strongly felt need for substances which can be easily manufactured at a low cost, and which have low level toxicity and high tumoricidal activity.

SUMMARY OF THE INVENTION

Accordingly, it is an object of this invention to provide a novel class of substances which can be easily manufactured economically.

It is another object of this invention to provide a novel class of substances which possess a low level of toxicity and high tumoricidal activity.

The present invention provides a novel class of glucan derivatives which satisfy all of the above objects of this invention, and other objects which will become apparent from the description of the invention given hereinbelow.

The inventors of this invention have discovered a new synthesis for novel glucan derivatives having at least one side chain of L-arabinofuranose, galactopyranose and/or a derivative thereof, and/or a mixture thereof, and/or an oligomer thereof such as arabinofuranan. The novel glucan derivatives include the compounds in their neutral form and all physiologically acceptable salts thereof.

The inventors have found that these glucan derivatives are easily prepared, and that they have high tumoricidal activity and are usable as tumoricides. The present invention thus provides a novel class of glucan derivatives, a process for making these derivatives, their use as tumoricides, and pharmaceutical compositions containing an amount of these derivatives effective for tumoricidal applications.

DETAILED DESCRIPTION OF THE PREFERRED EMBODIMENTS

Raw glucans which can be used in the manufacture of the glucan derivatives of the present invention include natural β-(1→3)-glucans having a molecular weight of 10,000 or more. Curdlan, pachman, β-(1→3)-glucans obtained from the cell walls of yeasts, as well as β-(1→4)-glucan (that is cellulose, etc.) are all raw glucans which can be used.

These glucans are combined with galactopyranose, L-arabinofuranose and/or oligomers thereof (such as dimers, trimers, etc.), to form side branch(es) on the glucan main chain. The degree of branching (defined as the number of the branches bonded to the main glucan chain per 100 glucose-units) can be 5 to 60 or so. In order to increase the water-solubility of the resulting glucan derivatives obtained, the branch(es) is(are) preferably bonded at least at the 6-position of the glucose units in the main glucan chain.

To introduce D-galactopyranose branch(es) into the glucan main chain, an ortho-ester of D-galactopyranose of the following formula (I) is preferably prepared.

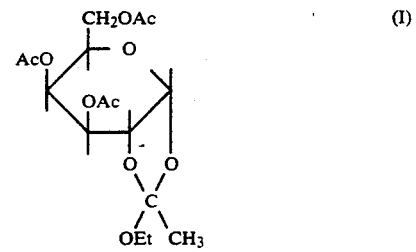

The resulting ortho-ester is condensed with hydroxy groups on the glucan.

For example, this condensation can be achieved by reacting the ortho-ester and the glucan in the presence of a 2,6-dimethylpyridinium perchlorate catalyst. The resulting intermediate is then de-esterified using a base, for example, using a methanol solution of sodium methoxide, to obtain the target product of a branched glucan.

To introduce L-arabinose branch(es) into the glucan main chain, or to introduce L-arabinose oligomer branch(es) into the glucan main chain, an ortho-ester of one of the following formulae (II) or (III) is used, respectively.

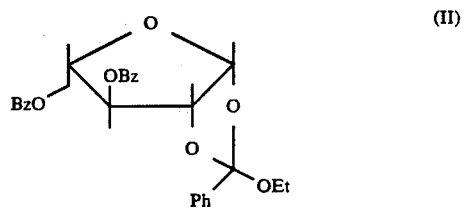

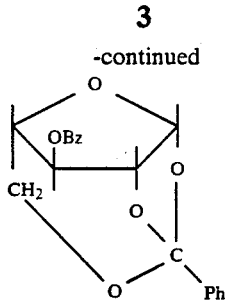

(III)

The ester is heated together with the main chain glucan under reflux to obtain the condensation of the orthoester with hydroxyl group(s) of the main chain glucan. The resulting product is then optionally de-esterified as described above, if necessary, to obtain the target final product of a water-soluble branched polysaccharide.

In all cases, the product may optionally be purified by dialysis, if necessary, and then freeze-dried to obtain a purified product.

In the above-mentioned reaction, the hydroxyl group(s) in the said main chain glucan may be acylated to enhance their reactivity. Typical $C_{2-6}$ acylating agents, e.g., a $C_2$ acylating agent can be used for this purpose. This acylation is achieved following well known procedures.

In particular, the degree of acylation-substitution in the raw material is preferably adjusted to from 1 to 2.5 or so, more preferably about 2 in view of the activity of the raw material. A raw material containing an acylation-substitution level of 1 to 2.5 is thus desirably used in the present invention.

For the methylation analysis to determine the structure of the product as obtained, the product, after having been subjected to complete methylation by Hakomori's method, is hydrolyzed, reduced and acetylated. The resulting partially methylated alditol-acetate is then subjected to GC-MS analysis.

The degree of branching in the product is regulated to be between 25% and 35%, preferably between 28% and 32%, most preferably about 30%, by repeating the condensation reaction several times. The condensation reaction can be repeated for example 2 to 3 times.

The glucan derivatives of the present invention can be used neat or formulated for use as pharmaceuticals for veterinary or human use by a variety of methods. For instance, they may be formulated as an aqueous, oily or emulsified composition incorporating a liquid diluent. These compositions most usually can be employed for parenteral administration, for example intravenously, intraabdominally, or intramuscularly and therefore may be conveniently sterile and pyrogen-free. Oral administration may also be used, and the glucan derivatives of the present invention may be given by this route. The dosage of administration may range from 0.1 mg per kg to 500 mg per kg, preferably 0.5 mg per kg to 100 mg per kg.

The glucan derivatives of the present invention can also be used in compositions incorporating a solid carrier, for example a conventional solid carrier material such as starch, lactose, dextrin or magnesium stearate. Such compositions can be presented for example as tablets, capsules (including spansules), etc.

These compositions may be formulated in unit dosage form, i.e. in the form of a discrete portion containing the unit dosage, or a multiple or sub-unit dose. While the dosage of the glucan derivative will depend on various factors, including the particular compound which is employed in the composition, the glucan derivative may be incorporated in the composition in the range of about 0.1 to 500 mg, preferably 0.5 to 100 mg.

In the present specification, Ac represents an acyl group, Et represents an ethyl group, Ph represents a phenyl group and Bz represents a benzoyl group.

Other features of the invention will become apparent in the course of the following descriptions of exemplary embodiments which are given for illustration of the invention, and are not intended to be limiting thereof.

EXAMPLE 1

Curdlan ($\beta$-(1→3)-glucan, distributed by Wako Pure Chemical Industries, Ltd.) was acetylated with acetic anhydride in pyridine for 5 minutes at 75° C. The resulting acetylated intermediate having a degree of substitution (DS) of 2.05 was exposed to an ethanol/water (1/1; v/v) solution for 24 hours, an ethanol/water (3/1; v/v) solution for another 24 hours and the ethanol for 4 hours. The acetylated intermediate was then washed with diethyl ether and dried under reduced pressure. This treatment intensified the activity of the intermediate.

To 1.0 g of the thus activated curdlan acetate suspended in 30 ml of chlorobenzene, a solution of 1.98 g of 3,5-di-O-benzoyl-(1,2-O-ethyl-ortho-benzoyl)-$\beta$-L-arabinofuranose (II) dissolved in 10 ml of chlorobenzene was added. The mixture obtained was heated at 70° C. for 60 minutes. The temperature was then elevated further, and after 5 ml of the solvent had been distilled out of the reaction mixture, 40 mg of 2,6-dimethylpyridinium perchlorate catalyst was added thereto and the whole was reacted for an additional 120 minutes under reflux. After the reaction, the product was precipitated in methanol, and then, washed with methanol followed by diethyl ether, and dried in vacuum. Yield: 0.97 g.

The glycosylation reaction of the product was repeated once more. Yield 1.0 g.

The product thus obtained (about 0.76 g) was suspended in 35 ml of a 1M-sodium methoxide in methanol solution and left to stand for 17 to 24 hours for de-esterification. After the completion of the reaction, 35 ml of water was added to the reaction mixture, the methanol distilled off under reduced pressure and the reaction mixture neutralized with 1N-hydrochloric acid.

The product obtained was subjected to dialysis for 3 to 4 days. After removal of insoluble material, the remaining aqueous solution was concentrated and freeze-dried to obtain a water-soluble polysaccharide. The ratio of the water-soluble material to water-insoluble material was 20:80 (w/w).

Next, the saccharide composition was completely methylated by Hakomori's method (S. Hakomori's "J. Biochem", 55, 205 (1964)), and then, hydrolyzed, reduced and acetylated. The resulting partially methylated alditol-acetate was subjected to gas chromatography-mass spectrum analysis for determination of its structure. The result is shown in the following Table 1.

The degree of branching (n) (defined as the number of branches per 100 glucose units of the main chain), was calculated in accordance with the following formulae (1) or (2):

$$n = \frac{(2,3,5 - A)}{(2,4,6 - G) + (2,6 - G) + (2,4 - G)} \quad (1)$$

$$n = \frac{(2,6 - G) + (2,4 - G)}{(2,4,6 - G) + (2,6 - G) + (2,4 - G)} \quad (2)$$

In the above formula, (2,3,5-A), (2,4,6-G), (2,6-G) and (2,4-G) each represent the molar number (relative value) of the partially methylated alditolacetate, as shown in the Table 1. The numerator and the denominator in formulae (1) and (2) each are in proportion to the number of the branches in the branched polysaccharide and the number of the glucose residues in the main chain.

A value of n=7.2% was obtained from formula (1) and n=8.3% was obtained from the formula (2). These values correspond well to the value of n=1/12.5=8% obtained from data derived from a saccharide composition analysis.

Regarding the positions of the branches bonded to the main chain in the polysaccharide of the final product, a value of (C-6):(C-4)=28:72 was obtained from the ratio of (2,4-G) (defined as bonding of the branched to the C-6 position of the glucose residue) to (2,6-G) defined as bonding to the C-4 position of the glucose residue). In this instance, attachment of the branches to the C-4 position are somewhat greater.

EXAMPLE 2

To 1.0 g of curlan acetate (DS 2.05) which had been activated in the same manner as the Example 1 and suspended in 50 ml of chlorobenzene, 1.41 g of 3-O-benzoyl-(1,2,5-O-ortho-benzoyl)-β-L-arabinofuranose (III) was added. The resulting mixture was heated for 60 minutes at 70° C. The heating temperature was then elevated further, and after 5 ml of the solvent was distilled out of the reaction mixture, 40 mg of 2,6-dimethylpyridinium perchlorate catalyst was added to the reaction mixture which was then heated for an additional 20 minutes under reflux.

After completion of the reaction, the product was precipitated in methanol. The resulting precipitate was washed with methanol followed by diethyl ether and dried in vacuum. Yield: 1.14 g.

The product was heated, swollen and arabinosylated with 3-O-benzoyl-(1,2,5-O-ortho-benzoyl)-β-L-arabinofuranose, whereupon and the treatment repeated. Yield: 1.22 g.

The resulting product was de-esterified with a 1M-sodium methoxide in methanol solution, neutralized, dialyzed, concentrated and freeze-dried, in the same manner as in the Example 1 to obtain a water-soluble branched polysaccharide. The ratio of the water-soluble material to water-insoluble material in the product was 70:30 (w/w).

The branched polysaccharide product thus obtained was methylated, hydrolyzed, reduced and acetylated in the same manner as in the Example 1, to obtain a partially methylated alditol-acetate. The structure and the molar ratio of this material was determined by gas chromatography. The result is shown in the Table 1. The final product obtained in this case contained 2,3-di-O-methyl-L-arabinitol-acetate in addition to 2,3,5-tri-O-methyl-L-arabinitol-acetate forming the arabinose-branch terminals of the side chains. The branches therfore comprised oligoarabinans.

An average length for branches (L) of 1.93 was obtained from the formula (3).

$$L = \frac{(2,3,5 - A) + (2,3 - A) + (3,5 - A)}{(2,3,5 - A)} \quad (3)$$

a degree of branching (n) of 32.0% was obtained from formula (1).

Thus data shows that the final product has about 30 branches of α-(1→5)-L-arabinofuranans having an average length of about 1.9-oligomer per 100 glucose units. These branches as bonded to the main chain at the (C-6) and (C-4) positions of the glucose residue, and the ratio of (C-6) to (C-4) bonding is about 62:38.

The presumed structural formula of the glucan derivatives obtained in the above-mentioned Examples 1 and 2 is as follows:

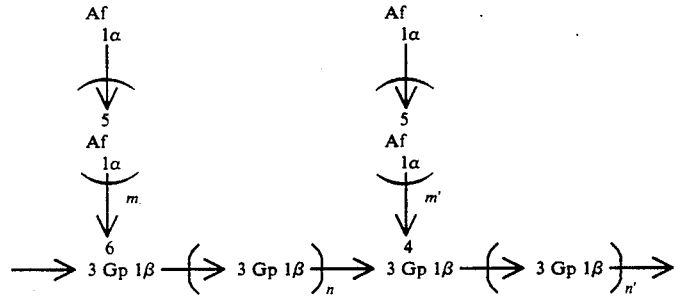

Gp = glucopyranose   Af = L-arabinofuranose

TABLE 1

| Methylated alditol-acetate | Example 1 | Example 2 |
|---|---|---|
| 2,3,5-A | 1.00 | 1.00 |
| 3,5-A | — | — |
| 2,3-A | — | 0.93 |
| 2,3,4,6-M | — | — |
| 2,4,6-G | 12.8 | 2.75 |
| 2,3,6-G | — | — |
| 2,6-G | 0.83 | 0.14 |
| 3,6-G | — | — |
| 2,3-G | — | — |
| 2,4-G | 0.33 | 0.23 |

Legend:
2,3,5-A = 2,3,5-tri-O-methyl-arabinitol-acetate
3,5-A = 3,5-di-O-methyl-arabinitol-acetate
2,3-A = 2,3-di-O-methyl-arabinitol-acetate
2,3,4,6-M = 2,3,4,6-tetra-O-methyl-mannitol-acetate
2,4,6-G = 2,4,6-tri-O-methyl-glucitol-acetate
2,3,6-G = 2,3,6-tri-O-methyl-glucitol-acetate
2,6-G = 2,6-di-O-methyl-glucitol-acetate
3,6-G = 3,6-di-O-methyl-glucitol-acetate
2,3-6 = 2,3-di-O-methyl-glucitol-acetate
2,4-G = 2,4-di-O-methyl-glucitol-acetate

EXAMPLE 3

To 0.69 g of curdlan acetate (DS 1.89) activated by solvent substitution, added to 30 ml of chlorobenzene and heated at 70° C. for 60 minutes to be swollen, a solution of 5.5 g of 3,4,6-tri-O-acetyl-(1,2-O-ethyl-ortho-acetyl)-α-D-galactopyranose (I) dissolved in 18 ml of chlorobenzene was added. The resulting mixture was heated. After 5 ml of chlorobenzene was distilled out of the reaction mixture, 20 mg of 2,6-dimethyl-pyridinium perchlorate catalyst was added, and the mixture was heated for an additional 120 minutes under reflux. After completion of the reaction, the product was precipitated in methanol, washed with methanol followed by ether, and then dried in vacuum. Yield: 0.66 g.

The product was heated, swollen and reacted with 3,4,6-tri-O-acetyl-(1,2-O-ethyl-ortho-acetyl)-α-D-galactopyranose. This sequence was repeated two times. Yield: 0.69 g.

15 ml of 0.5N NaOH was added to 0.3 g of the resulting product, and after the whole was kept at room temperature for 2 days it was neutralized with 0.1N HCl. The resulting solution was then subjected to dialysis for 3 to 4 days. Insoluble material was removed, and the soluble material was concentrated and freeze-dried. The amount of soluble material was 92% of the theoretical value.

Next, the composition (ratio of galatose/glucose) of the polysaccharide obtained and its molecular weight were determined.

The polysaccharide was hydrolyzed with formic acid, reduced with sodium borohydride and acetylated with acetic anhydride/pyridine. The resulting aldito-lacetate was analyzed by gas chromatography to obtain a ratio of galactose/glucose of 14.9%. The molecular weight of the acetylated polysaccharide was measured by gel permeation chromatography using a standard substance of mono-dispersed polystyrene. The molecular weight of the material was found to be 226,000.

The presumed structural formula of the thus obtained glucan derivative is as follows:

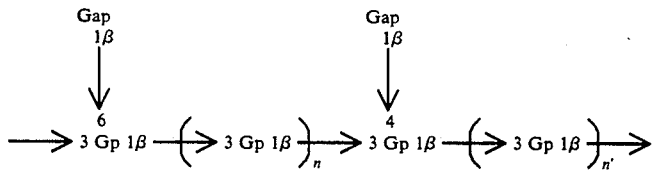

Gap = Galactopyranose, Gp = Glucopyranose

EXAMPLE 4

Tumoricidal Activity Test

Tumoricidal activity tests were carried out as follows.

$10^6$ cells of Sarcoma 180 were implanted into the axilla of an ICR-JCL mouse by hypodermic implantation. After 24 hours from the implantation, a physiological salt solution containing the polysaccharide of the invention was injected into the mouse intravenously or intra-abdominally injection in an amount of 5 or 10 mg/kg (body weight) or the said solution was perorally administered to the mouse in an amount of 10, 50 or 100 mg/kg (body weight), for 10 days. After 5 weeks from the implantation of the tumor cells, the tumorous material was removed from the mouse and its total weight designated by B grams. On the other hand, the total weight of the tumorous material taken out from a mouse in a control group (to which only a physiological salt solution not containing the polysaccharide of the invention had been applied) was designated by A grams. The tumor-inhibitory activity was then calculated from the following formula:

$$\text{Tumor-Inhibitory activity} = \frac{A - B}{A} \times 100 \, (\%)$$

The results in the test on the glucan derivatives as obtained in the previous Examples are given in the following Table 2.

TABLE 2

| Polysaccharide | Dosis | Administration pathway | Tumor-inhibition (%) | Number of completely cured mice |
|---|---|---|---|---|
| Example 1 | 5 mg/kg | intra-abdominal | 100 | 7/7 |
| Example 2 | 5 mg/kg | intra-abdominal | 100 | 7/7 |
| Example 3 | 10 mg/kg | intravenous | 100 | 7/7 |
| Example 3 | 10 mg/kg | intra-abdominal | 100 | 7/7 |
| Example 3 | 10 mg/kg | peroral | 52 | 0/7 |
| Example 3 | 50 mg/kg | peroral | 59 | 0/7 |
| Example 3 | 100 mg/kg | peroral | 79 | 3/7 |
| curdlan (comparison) | 5 mg/kg | intravenous | −5 | 0/7 |
| curdlan (comparison) | 5 mg/kg | intra-abdominal | 10.2 | 0/7 |
| curdlan (comparison) | 50 mg/kg | peroral | −17 | 0/7 |

As apparent from the above results, the new glucan derivatives of the present invention are very useful as tumoricides. The present invention is extremely significant in the field of medicinal industries.

Obviously, numerous modifications and variations of the present invention are possible in light of the following teachings. It is therefore to be understood that within the scope of the appended claims, the invention may be practiced otherwise than as specifically described herein.

What is claimed as new and desired to be secured by Letters Patent of the United States is:

1. A glucan derivative, comprising a β-1,3-glucan main chain having a degree of branching between 5% and 60% wherein branching side chains are selected from the group consisting of galactopyranose, L-arabinofuranose, oligomers of galactopyranose, oligomers of L-arabinofuranose, acylated derivatives thereof, mixed oligomers thereof; and mixtures thereof.

2. The glucan derivative of claim 1, wherein said branching side chains are bound to the glucan main chain on the 6-position of glucose units constituting the main chain.

3. The glucan derivative of claim 1, wherein the average length of said oligomers is about 1.9 monomer units.

4. A glucan derivative obtained by:
(1) reacting a glucan material having a β-1,3-glucan main chain and having a molecular weight of at least about 10,000 or an acylated derivative thereof with a reactive material which is at least one member selected from the group consisting of galactopyranose orthoesters, oligomers of galactopyranose orthoesters, acylated derivatives thereof, mixed oligomer orthoesters thereof, and mixtures thereof; and (2) obtaining a glucan derivative made up of a glucan main chain having at least one side chain corresponding to said reactive material.

5. A pharmaceutical composition comprising:
(i) a glucan derivative made up of a β-1,3-glucan main chain having a degree of branching between 5% and 60% wherein branching side chains are selected from the group consisting of galactopyranose, L-arabinofuranose, oligomers of galactopyranose, oligomers of L-arabinofuranose, acylated derivatives thereof, mixed oligomers thereof; and mixtures thereof; and
(ii) a pharmaceutically acceptable carrier or diluent.

6. The composition of claim 5, comprising from 0.1 to 500 mg of the glucan derivative.

* * * * *